Patented Nov. 16, 1948

2,453,729

UNITED STATES PATENT OFFICE 2,453,729

BENZHYDRYL AMINO ETHERS

George Rieveschl, Jr., Grosse Pointe Woods, Mich., assignor to Parke, Davis & Company, Detroit, Mich., a corporation of Michigan No Drawing. Application August 5, 1946, Serial No. 688,424

7 Claims. (Cl. 260—243)

This invention relates to amino ethers and their acid addition salts and to methods for obtaining the same. More specifically, the invention relates to basically substituted benzhydryl ethers and their acid addition salts. The free bases of the basically substituted benzhydryl ethers of the invention have the formula,

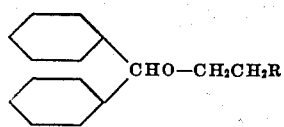

where R is a piperidino, morpholino, thiomorpholino or a pyrrolidino radical.

The compounds of the present invention may be obtained as a free base having the formula given above or as acid addition salts of the base with inorganic or organic acids. Some examples of the salts which may be prepared by the methods hereinafter described are the hydrochloride, hydrobromide, hydroiodide, sulfate, phosphate, acetate, citrate, oxalate, succinate, benzoate, tartrate, phthalate, maleate, oleate and the like.

The basically substituted benzhydryl ether compounds may be prepared by several different processes. For example, these compounds may be prepared by the condensation of a benzhydryl halide with a β-R-substituted ethanol. The condensation of these two reactants may be carried out by several different methods, e. g. it may be effected in the presence or absence of an acid-binding agent or with or without a solvent. Another method for preparing these compounds consists in reacting an alkali metal salt of benzhydrol with a β-R-substituted ethyl halide or, if desired, the reactants may be interchanged and an alkali metal salt of a β-R-substituted ethanol reacted with a benzhydryl halide. A further method of preparation consists in reacting a β-haloethyl benzhydryl ether with piperidine, morpholine, thiomorpholine or pyrrolidine.

The free bases and the acid addition salts of the basically substituted benzhydryl ethers are powerful anti-histamine agents. They are also useful in preventing smooth muscle spasms induced by histamine, acetyl choline or barium chloride. Another property of these compounds is that they inhibit gastric secretion which has been induced either by meal or histamine stimulus. The new compounds may be administered to humans orally, parenterally, rectally or as a vapor or mist. They find particular use in humans for treatment of allergic conditions (asthma, urticaria, histamine cephalagia and anaphylactic shock) and smooth muscle spasms (biliary spasm and dysmenorrhea). For example, the compound shown in Example 1, β-piperidinoethyl benzhydryl ether hydrochloride, may be administered to humans orally in a dosage of 100 to 600 mg. per day and intravenously in a dosage of 100 to 600 mg. per day and intravenously in a dosage of 10 to 100 mg. per day. However, because of the high activity of this compound and the other compounds of this invention, it has been found that a dosage of 150 mg. per day orally or 20 mg. per day by the intravenous route is usually sufficient in the treatment of smooth muscle spasms and most allergic conditions.

This application is a continuation-in-part of my copending application, Serial No. 531,639, filed April 18, 1944, now Patent No. 2,421,714 issued June 3, 1947.

The invention is illustrated by the following examples.

*Example 1.—β-Piperidinoethyl benzhydryl ether*

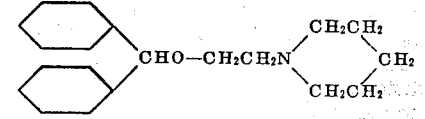

(a) 247 g. of benzhydryl bromide is added to a refluxing solution of 260 g. of β-piperidinoethanol and 100 cc. of toluene. After the addition has been completed, the mixture is refluxed about fifteen hours, cooled and the lower layer consisting of the hydrobromide salt of β-piperidinoethanol drawn off. The upper layer is distilled in vacuo to obtain the desired β-N-piperidinoethyl benzhydryl ether as a colorless liquid.

The free base may also be purified through the acid oxalate acid addition salt. The excess amino alcohol and toluene are distilled from the upper layer of the reaction mixture at atmospheric pressure or at slightly reduced pressure and the residue added to a warm solution of 126 g. of oxalic acid dihydrate in 500 cc. of isopropanol. The crystalline acid oxalate salt which separates from the solution is collected, suspended in water and treated with an excess of 25% potassium hydroxide solution. The free base of the product which separates as an oily layer from the alkaline solution in almost pure form is drawn off and stored as such or used in the preparation of an acid addition salt as described below.

The free base is converted to the hydrochloride salt by dissolving it in dry ethyl ether and adding an excess of dry gaseous hydrogen chloride gas. The precipitated salt is collected and purified by recrystallization from isopropanol; M. P. 168.5–9.5° C. The hydrobromide salt may be prepared in a similar manner and recrystallized from either absolute ethanol-ether mixture or isopropanol.

(b) 18.4 g. of benzhydrol, 5 g. of sodium and 120 g. of xylene are refluxed for ten hours. The solution is cooled and the excess sodium removed. An ether solution containing 18.4 g. of β-piperidinoethyl chloride is added and the mixture refluxed for three hours. The mixture is cooled and treated with water to dissolve the inorganic salts. The organic layer is separated, washed several times with water and then extracted with several portions of 3 N hydrochloric acid. The acid extracts are treated with decolorizing carbon and filtered. The free base is liberated from the acid solution by the addition of 20% sodium hydroxide solution, taken up in ether and the ether extract dried. The ether is distilled and the residue distilled under reduced pressure to obtain the pure free base of β-piperidinoethyl benzhydryl ether. The hydrochloride salt is prepared by dissolving the free base in anhydrous ether and slowly adding an alcoholic solution of hydrogen chloride. The salt is collected and purified by recrystallization from isopropanol; M. P. 168–9° C.

*Example 2.—β-Morpholinoethyl benzhydryl ether*

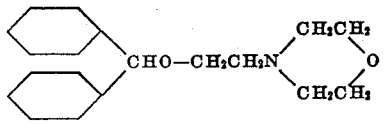

A mixture consisting of 524 g. of β-morpholinoethanol and 65 g. of potassium carbonate is heated at 120° C. and 202.5 g. of benzhydryl chloride added to the stirred mixture over a period of one hour. After the addition has been completed the mixture is stirred and heated for an additional fifteen hours and then the excess amino alcohol distilled off in vacuo. The residue is washed with water to remove the potassium chloride and then added to a warm solution of 126 g. of oxalic acid dihydrate in 500 cc. of isopropanol. The acid oxalate salt of the desired product which separates on cooling is collected, suspended in water and treated with an excess of 30% sodium hydroxide solution in the cold. The free base is extracted with ether, the ether extract dried and then treated with an excess of dry hydrogen chloride gas. The white hydrochloride of β-morpholinoethyl benzhydryl ether is collected and purified by recrystallization from isopropanol; M. P. 182–3° C.

The citrate salt can be prepared by treating an ether solution of the free base with a saturated ether solution of citric acid. The citrate which separates from the solution as a finely divided powder is filtered off and purified by washing it with ether.

250 mg. per day of the compounds of this example given orally or 35 mg. per day by the intravenous route is an adequate dosage in the treatment of smooth muscle spasms and most allergic conditions due to histamine.

*Example 3.—β-Thiomorpholinoethyl benzhydryl ether*

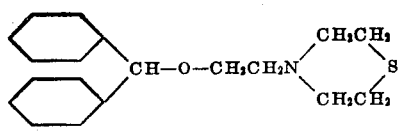

23 g. of sodium wire is added to a solution of 225 g. of β-thiomorpholinoethanol in 500 cc. of dry benzene and the resulting mixture stirred and heated until all the sodium has reacted with the amino alcohol. A solution of 294 g. of benzhydryl iodide in 300 cc. of dry benzene is added slowly to the rapidly stirred and refluxing mixture and after the addition has been completed the mixture is refluxed for fifteen hours. The mixture is cooled, washed with several portions of water to remove the sodium iodide and the organic layer distilled in vacuo to remove the benzene and excess amino alcohol. The residue is treated with an excess of dilute hydrochloric acid and the mixture extracted with ether. The ether extract is discarded and the aqueous solution made alkaline with 20% sodium hydroxide solution in the cold. The free base is extracted with ether, the ether extract dried and treated with an excess of dry hydrogen bromide gas. The hydrobromide salt of the desired β-thiomorpholinoethyl benzhydryl ether which separates is collected and purified by recrystallization from isopropanol.

The compound of this example is used in approximately the same dosages as the compound of Example 2 in the treatment of smooth muscle spasms and allergic conditions due to histamine.

*Example 4.—β-pyrrolidinoethyl benzhydryl ether*

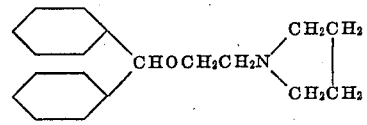

247 g. of benzhydryl bromide is added to a refluxing solution of 115 g. of β-pyrrolidinoethanol and 100 cc. of xylene. After the addition has been completed the mixture is refluxed about fifteen hours, cooled and the lower layer consisting of the hydrobromide salt of β-pyrrolidinoethanol drawn off. The upper layer is distilled in vacuo to obtain the desired β-pyrrolidinoethyl benzhydryl ether as a colorless liquid.

The free base is converted to the hydrochloride salt by dissolving it in dry ethyl ether and adding an excess of dry gaseous hydrogen chloride gas. The precipitated salt is collected and purified by recrystallization from isopropanol. By adding an equivalent amount of sulfuric acid to an ether solution of the free base the sulfate salt may be obtained in the same manner.

Attention is called to my copending applications, Serial Nos. 688,420, 688,421, 688,422 and 688,423, all filed August 5, 1946, and Serial No. 15,257, filed March 16, 1948, wherein certain processes adapted for the preparation of the compounds herein claimed are disclosed and claimed.

Attention is also called to the fact that compounds somewhat related to those claimed herein are described and claimed in my copending applications as follows: Serial No. 640,685, filed January 11, 1946; Serial No. 640,686, filed January 11, 1946; Serial No. 640,687, filed January 11, 1946; Serial No. 660,406, filed April 8, 1946; Serial No. 688,425, filed August 5, 1946; Serial No. 688,426, filed August 5, 1946; Serial No. 688,427, filed August 5, 1946; Serial No. 739,985, filed April 8, 1947; Serial No. 751,983, filed June 2, 1947; Serial No. 751,984, filed June 2, 1947; Serial No. 751,985, filed June 2, 1947; Serial No. 780,099, filed October 15, 1947; and Serial No. 33,432, filed June 16, 1948.

What I claim as my invention is:

1. A compound of the class consisting of a free base and its acid addition salts, said free base having the formula

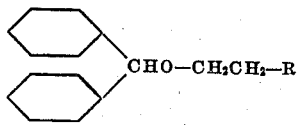

where R is a member of the class consisting of piperidino, morpholino, thiomorpholino and pyrrolidino radicals.

2. A compound of the class consisting of a free base and its acid addition salts, said free base having the formula,

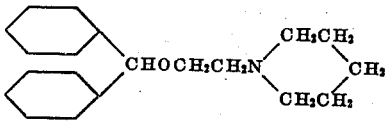

3. β-piperidinoethyl benzhydryl ether hydrochloride.

4. A compound of the class consisting of a free base and its acid addition salts, said free base having the formula,

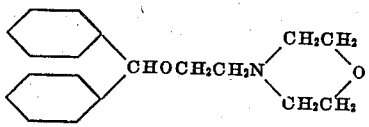

5. β-morpholinoethyl benzhydryl ether hydrochloride.

6. A compound of the class consisting of a free base and its acid addition salts, said free base having the formula,

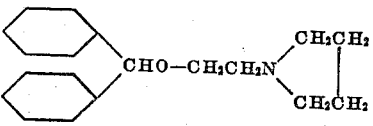

7. β-pyrrolidinoethyl benzhydryl ether hydrochloride.

GEORGE RIEVESCHL, Jr.

No references cited.